Aug. 23, 1966      R. L. OWENS      3,268,249
COUPLING
Filed Aug. 26, 1964

Robert L. Owens
INVENTOR.

BY J. Vincent Martin
   Joe E. Edwards
   M. H. Gay
ATTORNEYS

United States Patent Office 3,268,249
Patented August 23, 1966

3,268,249
COUPLING
Robert L. Owens, Houston, Tex., assignor to White Manufacturing Co., Houston, Tex., a corporation of Texas
Filed Aug. 26, 1964, Ser. No. 392,108
4 Claims. (Cl. 285—312)

This invention relates to coupling assemblies, and more particularly to quick-detachable coupling assemblies for use with very thin-wall pipe.

Very thin-wall pipe made from aluminum and the like is presently used in irrigating fields. This pipe is considered to be portable and is frequently moved about with the result that it is very frequently damaged, particularly at its ends where it is secured to quick-release couplers. The past practice has been to provide a thread system for connecting the thin-wall pipe and couplers, and when a pipe end is damaged, it has been the practice in the past to discard the length of pipe.

An object of this invention is to provide a coupling system for thin-wall pipe which does not employ threads and in which a damaged end of a length of pipe may be cut off and the shortened length of pipe re-used.

Another object is to provide a coupler system as in the preceding object in which a pipe coupling may couple together a threaded end pipe and a pipe system constructed in accordance with this invention to permit simultaneous use of threaded pipe and pipe connected to the coupler in accordance with this invention.

Other objects, features and advantages of the invention will appear from the specification, the drawing and the claims.

In the drawing, wherein like reference numerals indicate like parts, and wherein allustrative embodiments of this invention are shown;

Figure 1:
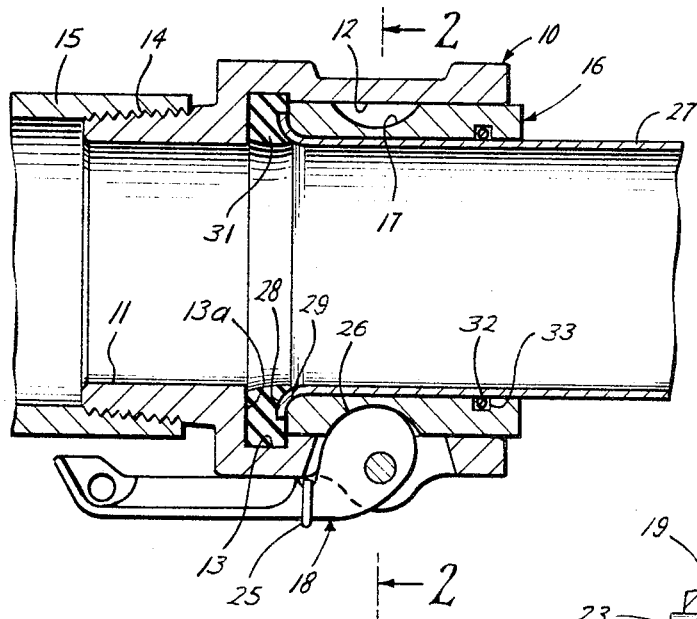
FIGURE 1 is a cross-sectional view through a coupling assembly constructed in accordance with this invention.

Referring first to FIGURE 1, the coupler indicated generally at 10 includes a bore 11 in one end thereof. A counteborer 12 extends from the bore to the other end of the coupler. At the juncture of the bore and counterbore a groove 13 is provided.

In accordance with this form of the invention, one end of the coupler is provided with a suitable thread system 14 for securing it to a conventional thin-wall pipe 15.

Figure 2:
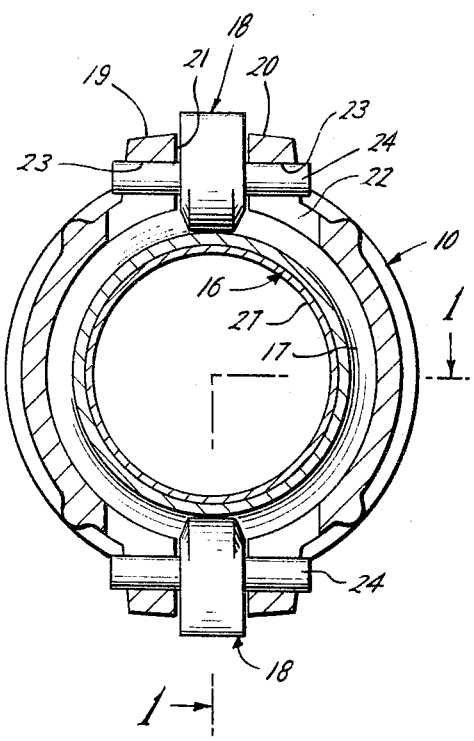
FIGURE 2 is a view taken along the line 2—2 of FIGURE 1.

An adapter indicated generally at 16 is provided in the counterbore 12. This adapter has an annular concave groove 17 in its outer periphery. A suitable latch means indicated generally at 18 is carried by the coupler 10 and cooperates with the concave groove 17 to hold the adapter in place in the coupler. The cam latch means is carried by ears 19 and 20 on the coupler. From FIGURE 2 it will be noted that a suitable slot 21 is provided between these ears which extends all the way through the coupler and parallel to the central axis thereof. A second slot 22 is provided in the coupler transverse to the slot 21 and extends from the interior of the coupler out to the surface 23 in the ears. This surface 23 and the slot 22 provide hinge surfaces for the pin 24 carried by the latch means. A suitable clamp ring 25 about the arms of the latch holds the latch in place after the handle has been extended through the slot 21, and the pin 24 is in engagement with the groove 22. It will be noted that the latch means includes a cam surface 26 which, as the latch is moved from a position in nonengagement with the concave groove 17 in the adapter to the position shown in FIGURE 1, results in movement of the adapter into the coupler.

A thin-wall pipe 27 is provided in the adapter and extends all the way through the adapter. This pipe has its end 28 flared outwardly over the end of the adapted which is rounded as at 29. The flared end of the pipe extends into the recess 13.

A suitable seal member 31 of resilient material is provided within the groove 13. This seal member seals between the flared pipe end 28 and the wall 13a of groove 13 to in this manner provide a seal between the coupler and the pipe 27.

A suitable resilient member such as an O-ring 32 surrounds the pipe 27 and engages the adapter 16 to hold the adapter in place on the pipe. If desired, this seal ring may be positioned in groove 33 within the adapter.

It will be noted that in the event the pipe 27 is bent or otherwise damaged adjacent its end, it is a very simple operation to cut off the damaged end of the pipe and, using a conventional flaring tool, flare the end of the pipe to provide a flared end 28 and continue using the undamaged section of the pipe. This is not possible with the pipe 15 where a thread system is employed, as a damaged thread system renders the pipe unusable.

Figure 3:
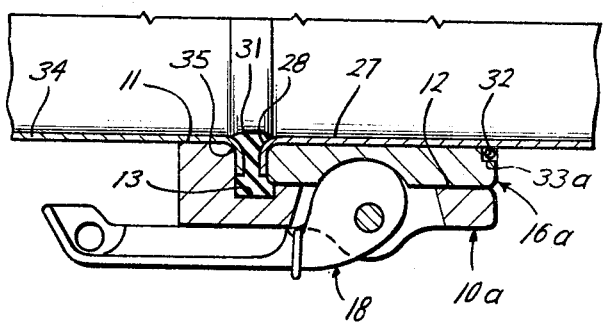
FIGURE 3 is a quarter-section view similar to FIGURE 1 showing the manner in which the coupling assembly of this invention is utilized with two similar non-threaded pipe ends.

Reference is now made to FIGURE 3 in which this invention is shown with two flared end pipes. In this case, the coupler indicated generally at 10a is identical with coupler 10 execept that the threaded end is omitted. It is provided with the bore 11 and counter bore 12, together with recess 13, and the cam latch means 18. In this case, the adapter 16a differs only in that the groove 33 is shown at 33a in the end of the adapter, but its function is the same. The pipe 27 is flared at 28 in the same manner as shown in FIGURE 1.

Instead of the threaded connection 11, the pipe 34 extends into the bore 11 of the coupler and has its free end flared at 35 and extending into the groove 13.

The seal 31 is provided in the recess 13 and seals between the two flared pipe ends 35 and 28.

It will be apparent from FIGURE 3 that the coupling assembly of this invention permits the securing together of two thin-wall piper without the use of a thread system. If any damage occurs to either of the pipes, it can be cut off, reflared and re-used with simple tools which can be used in the field.

It might be noted that the coupler of FIGURE 1 and FIGURE 3 are identical with the exception of the thread system 14, and therefore this coupler 10 may also be used to couple together two plain-end pipes by inserting the pipe into bore 11 and bending it about the surface 13a. In this instance, the thread system 14 would not be used and would be on the exterior of the pipe.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. A coupling assembly for connecting two thin wall pipes comprising:
   a male and female coupling member adapted to interfit with each other,
   said male member having a bore therethrough,
   said female member having a bore in one end thereof and a counterbore extending from said bore to the other end of the member for receiving the male member,
   at least one of said members being loosely mounted on one of said pipes for relative axial movement thereon, said one pipe having one end flared outwardly to a plane substantially normal to the axis of the pipe,
resilient means including at least one resilient means to seal said coupling against the passage of fluid out of said joint between said pipes and disposed between said one pipe and said one member to retain the flared end of the pipe in contact with a radially extending surface on said one member when the members are uncoupled,
an external annular groove in said male member,
and cam latch means carried by said female member and cooperative with said groove to couple said members together.

2. The coupling of claim 1 wherein said resilient means is an annular seal located at the juncture of said bore and counterbore which seal extends inwardly beyond the outermost curved portion of the flared end of the pipe to provide a lip type seal with the pipe.

3. A coupling assembly for connecting two thin wall pipes comprising:
a male and female coupling member adapted to interfit with each other,
said male member having a bore therethrough,
said female member having a bore in one end thereof and a counterbore extending from said bore to the other end of the member for receiving the male member,
an annular recess in the counterbore at the juncture of the bore and counterbore,
said male member being loosely mounted on one of said pipes and said female member being loosely mounted on the other of said pipe for relative axial movement thereon,
each of said pipes having one end flared outwardly to a plane substantially normal to the axis of the pipe,
resilient means disposed between the pipe and said male member to retain the flared end of the pipe in contact with a radially extending surface on said male member when the members are uncoupled,
an annular seal ring in said recess retaining the flared end of the pipe in the female member against the shoulder defined by the juncture of the bore and counterbore when the members are uncoupled and sealing between the flared ends of said two pipes when the members are coupled,
an external annular groove in said male member,
and cam latch means carried by said female member and cooperative with said groove to couple said members together.

4. The coupling of claim 3 wherein the annular seal ring extends inwardly beyond the outermost curved portions of said flared pipe ends to provide a lip type seal with said pipe ends.

References Cited by the Examiner

UNITED STATES PATENTS

| | | | |
|---|---|---|---|
| 1,477,696 | 12/1923 | Dollman. | |
| 2,033,142 | 3/1936 | Lewis | 285—312 |
| 2,374,138 | 4/1945 | Sanford. | |
| 3,124,374 | 3/1964 | Krapp | 285—312 X |
| 3,127,199 | 3/1964 | Roe | 285—349 |

FOREIGN PATENTS 190,228   6/1937   Switzerland.

CARL W. TOMLIN, *Primary Examiner.*

D. W. AROLA, *Assistant Examiner.*